United States Patent

Sugaya et al.

[15] 3,674,942

[45] July 4, 1972

[54] MAGNETIC RECORDING AND REPRODUCING APPARATUS OF CASSETTE TYPE

[72] Inventors: Hiroshi Sugaya, Suita; Takuya Nasu, Hirakata, both of Japan

[73] Assignee: Matsushita Electric Industrial Co., Ltd., Osaka, Japan

[22] Filed: Nov. 24, 1970

[21] Appl. No.: 92,544

Related U.S. Application Data

[63] Continuation of Ser. No. 673,166, Oct. 5, 1967, abandoned.

[30] Foreign Application Priority Data

Oct. 17, 1966 Japan....................................41/68833

[52] U.S. Cl.................179/100.2 Z, 178/6.6 A, 179/100.2 T, 226/183, 242/199, 274/4 C

[51] Int. Cl.........................................................G11b 23/08

[58] Field of Search...........178/6.6 A; 179/100.2 Z, 100.2 T, 179/100.2 D; 226/91, 183; 242/55.19 A, 194, 197–200; 274/4 B, 4 C; 352/72, 159

[56] References Cited

UNITED STATES PATENTS

| | | | |
|---|---|---|---|
| 2,702,834 | 2/1955 | Golle et al. | 179/100.2 |
| 3,037,093 | 5/1962 | Nowlan | 179/100.2 |
| 3,083,925 | 4/1963 | Schoebel | 242/194 |
| 3,111,281 | 11/1963 | Sinkewitsch | 242/200 |
| 3,232,688 | 2/1966 | Bavaro | 352/159 |
| 3,327,053 | 6/1967 | Arimura et al. | 178/6.6 |

*Primary Examiner*—J. Russell Goudeau
*Attorney*—Stevens, Davis, Miller, & Mosher

[57] ABSTRACT

A magnetic recording and reproducing apparatus of the cassette type having a tape drive system in which a tape supply reel and a take-up reel are accommodated in a juxtaposed or unitarily stacked relation in a detachable tape cassette and movable tape guide rollers or pins are provided so that a magnetic tape can substantially straightly run in the quick feed and quick rewinding operation without being interfered by a rotary video head and other members, while the tape can be brought into engagement with the rotary video head in the recording and reproducing operation.

8 Claims, 10 Drawing Figures

INVENTORS

HIROSHI SUGAYA, TAKUYA NASU

BY Stevens, Davis, Miller & Mosher

ATTORNEYS

INVENTORS

HIROSHI SUGAYA, TAKUYA NASU,

BY Stevens, Davis, Miller & Mosher

ATTORNEYS

INVENTORS
HIROSHI SUGAYA, TAKUYA NASU
BY Stevens, Davis, Miller & Mosher
ATTORNEYS

MAGNETIC RECORDING AND REPRODUCING APPARATUS OF CASSETTE TYPE

CROSS-REFERENCE TO RELATED APPLICATION

This is a continuation of application, Ser. No. 673,166 filed Oct. 5, 1967 now abandoned.

This invention relates to a magnetic recording and reproducing apparatus of the cassette type, and more particularly to a magnetic tape drive system for use in such an apparatus.

A very troublesome and time-consuming procedure has heretofore been required when placing a prior art magnetic recording and reproducing apparatus in operation because a magnetic tape carrying thereon video and audio recordings had to be unwound over a length of a few feet at its leading end portion from a tape supply reel and the magnetic tape gripped by hand at its leading end had to be guided along a complex path defined by tape guide rollers, guide pins, a rotary video head, an erase head and an audio and control head to be securely fixed to a take-up reel at the leading end portion. Very great inconvenience was involved in the above procedure since the apparatus could not properly operate if the magnetic tape was erroneously placed so as to follow a wrong path.

In the prior apparatus of this kind, the mounting and dismounting of the magnetic tape by using the hand has inevitably given rise to the undesirable attachment of dust, sweat and fatty or saline matters to the magnetic tape, especially to the magnetic coating on the tape, and the attachment of such matters has, in many cases, resulted in the development of trouble such as head clogging or drop-out. Especially, a saline grease transferred from the hand to the magnetic tape constitutes one of the major causes of objectionable head clogging.

The prior tape drive system was further defective in that the run-out magnetic tape was disengaged from the reel at the trailing end of the tape and it was therefore necessary to rewind the tape after securely fixing the trailing end of the tape to the reel again. In the prior tape drive system, an extremely great difficulty has been encountered when it is desired to dismount the tape reels during an intermediate stage of the recording or reproduction. The unloading and reloading of the tape reels require a lot of time and may possibly impart injury to the magnetic tape, which results in objectionable head clogging or drop-out.

The prior tape drive system was also defective in that a large force was required in the quick feed and quick rewinding of the magnetic tape because the magnetic tape in such an instance travels at high speed while contacting the tape guide cylinder surrounding the rotary video head. A further defect involved in the prior magnetic recording and reproducing apparatus having the tape drive system as described above has been the difficulty of affixing to the apparatus a rerecording preventing device which is useful for preventing making a rerecording on a recorded magnetic tape thereby ensuring the preservation of the recordings on the magnetic tape.

SUMMARY OF THE INVENTION

It is therefore an object of the present invention to provide a rotary head type magnetic recording and reproducing apparatus of the cassette type having a novel tape drive system in which a magnetic tape can be kept away from its recording or reproducing position engaging the tape guiding surface of a rotary video head when the mounting or dismounting of the tape, or the quick feed or quick rewinding of the tape is required, so that such operation can easily be effected, the magnetic tape can be protected against any damage thereto, and a motor of small capacity can be economically employed by virtue of the small friction encountered by the tape during its quick feed and quick rewinding operation. As is commonly known, the power of the tape drive motor when used in common to drive both the capstan and reels is determined by the force required to effect the desired quick feed of the tape. Accordingly, it is to be noted that the apparatus of the present invention can be made small in size and light in weight.

Another object of the present invention is to provide an improved tape drive system in which the prior problems of the drop-out, the formation of crumples on a magnetic tape, and the one-sided stretch of the tape, which have frequently occurred on the tape when it runs at high speed while contacting a plurality of guide posts and guide rollers, can be completely eliminated by virtue of the fact that the magnetic tape can now unobstructedly and quickly run free from any restrictions imparted thereto by these guide members.

A further object of the present invention is to provide a tape drive system cooperable with a magnetic tape encased in a tape cassette so that the magnetic tape can easily be handled for mounting and dismounting and can be extended in its service life by virtue of the complete freedom from head clogging and drop-out since the magnetic tape can be fed or rewound as desired without any need for manual handling thereof. As is commonly known, the service life of a magnetic tape is generally determined by the number of drop-outs, and the magnetic tape is said to be unfit for use when the number of such drop-outs exceeds several tens. Therefore, when used in the apparatus of the cassette type, the service life of the tape is prolonged.

Still a further object of the present invention is to provide a tape drive system cooperable with a magnetic tape whose opposite ends are securely fixed to the reels in a tape cassette. By virtue of the above arrangement, the magnetic tape at the end of each run can not be disengaged from the reels and thus there is no need of elaborately setting the magnetic tape after each run. In the prior tape drive system, a magnetic tape at the end of each run is idly rotating and its trailing end portion is caused to strike against various portions of the system, with the result that the binder at that portion is weakened or stripped off the tape to bring forth objectionable head clogging and drop-out. The present invention is also effective in eliminating the possibility of such head clogging and drop-out.

Another object of the present invention is to provide a tape drive system cooperable with a rerecording preventing device provided on a portion of a cassette receiving therein a magnetic tape so as to easily prevent any possibility of making a rerecording on a magnetic tape already having recordings thereon.

Still another object of the present invention is to provide a tape drive system cooperable with a magnetic tape which is encased in a cassette in such a manner that it is kept away from the tape guide rollers and tape guide posts during the tape mounting and dismounting operation, so that the magnetic tape can be mounted or dismounted by a mere loading or unloading of the cassette.

Figure 1:
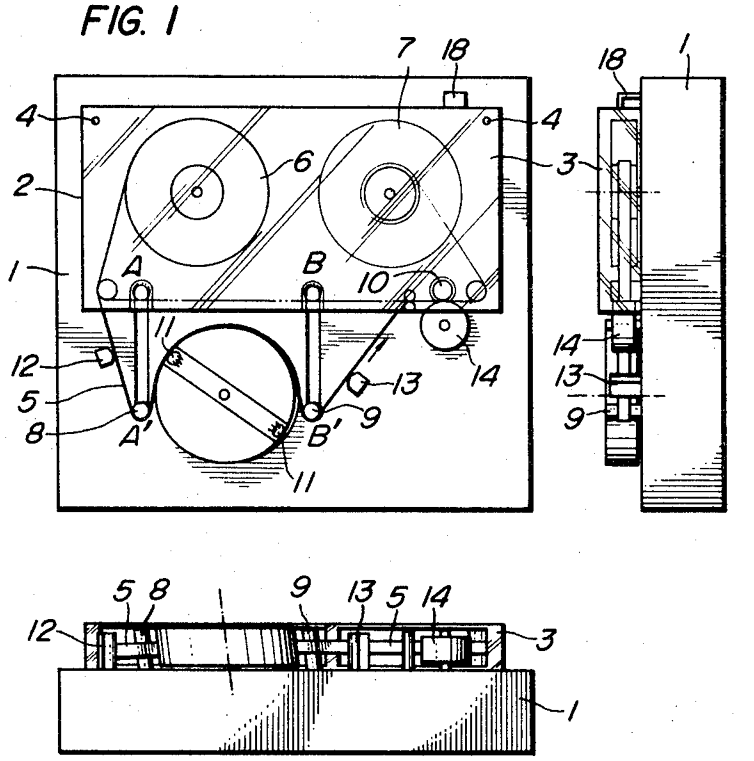
FIGS. 1A, 1B and 1C are plan, elevational and side views, respectively, of a magnetic recording and reproducing apparatus of the cassette type having a novel tape drive system embodying the present invention, with the elevational view and side view of the apparatus showing the overall structure of the apparatus.

Referring to FIG. 1, there is shown a magnetic recording and reproducing apparatus of the cassette type which includes a body 1 containing therein a mechanism necessary for the video signal recording and reproduction and having a generally rectangular portion 2 for securely receiving thereon a tape cassette 3 made from a transparent resin or like material. The tape cassette 3 can be placed at a predetermined position in the portion 2 by being guided and fixed in place by a plurality of guide pins 4 extending upwardly from the bottom of the portion 2 into corresponding holes in the cassette 3. The tape cassette 3 contains therein a magnetic tape 5 which is passed about a supply reel 6 and a take-up reel 7 along a path as shown by a dotted line in FIG. 1.

Figure 2:
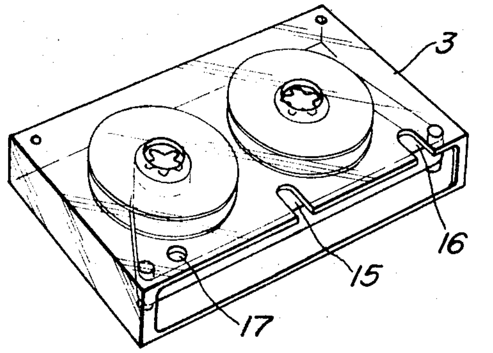
FIG. 2 is a perspective bottom view of a tape cassette in the apparatus shown in FIG. 1.

A pair of movable tape guide means 8 and 9, a capstan 10, a rotary video head 11 accommodated in a tape guide cylinder, an erase head 12, an audio and control head 13, and a pinch roller 14 are provided on the body 1 of the apparatus. The movable tape guide means 8 and 9 are connected to a suitable lever or like means (not shown) and are adapted to move from their normal non-operative positions A and B to their operative positions A' and B', respectively. As shown in FIG. 2, the tape cassette 3 has on its bottom wall a pair of perforations 15 and 16 for receiving therein the respective movable guide means 8 and 9 when the cassette 3 is placed in the position as shown in FIG. 1. The cassette 3 also has a perforation 17 on its bottom wall to receive therein the capstan 10. In the state as shown by the dotted line in FIG. 1, the magnetic tape 5 is slightly spaced from the movable tape guide means 8 and 9, and is drivingly engaged by the capstan 10 and the pinch roller 14 so that the quick feed and quick rewinding of the magnetic tape 5 can unobstructedly be effected without being bent by the movable tape guide means 8 and 9. It will be understood that the magnetic tape 5 at such a position can extremely easily run between the supply reel 6 and the take-up reel 7, and hence a drive motor of small size and capacity suffices and the size, weight and cost of the apparatus as a whole can thereby be greatly reduced.

When the recording or reproduction is desired, the movable tape guide means 8 and 9 may merely be advanced from their non-operative positions A and B to their operative positions A' and B', which establishes a path of the tape travel along a substantial portion of the surface of the guide cylinder containing therein the rotary video head 11 as well as along the erase head 12 and the audio and control head 13.

In prior magnetic recording and reproducing apparatus, the structure was such that an erase head and an audio and control head were always in contact with the recording medium coating on a magnetic tape, and was, therefore, defective in that scars are liable to develop on the tape surface and such scars provide the major cause for a drop-out on the reproduced picture. In accordance with the drive system embodying the invention, the recording medium coating on the magnetic tape is substantially free from any contact with such head means during the quick feed and quick rewinding operation in which damage to the magnetic tape is most likely to take place, and thus the service life of the magnetic tape can be greatly extended. By the way, the service life of a magnetic tape is generally determined by the number of drop-outs in the reproduced picture, and the tape must be erased when, for example, more than 100 drop-outs per minute appear on the picture because a proper view of the picture is thereby extremely spoiled.

The most important feature of the tape drive system shown in FIG. 1 is its remarkable simplicity in structure, but this tape drive system has a slight drawback in that the magnetic tape must travel along a highly curved path during the recording and reproduction.

Figure 3:
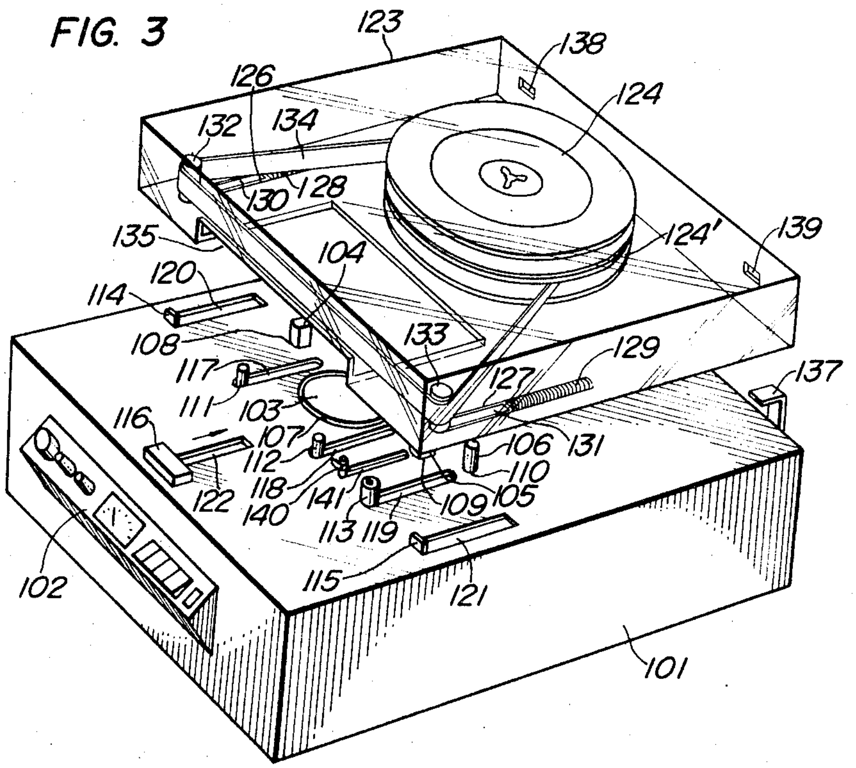
FIG. 3 is a perspective view of a magnetic recording and reproducing apparatus of the cassette type having another form of the tape drive system according to the present invention.
Figure 4:
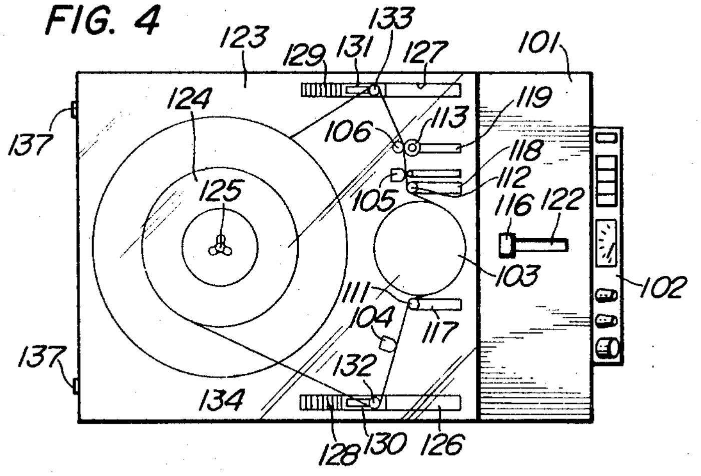
FIG. 4 is a top plan view of the apparatus shown in FIG. 3.
Figure 5:
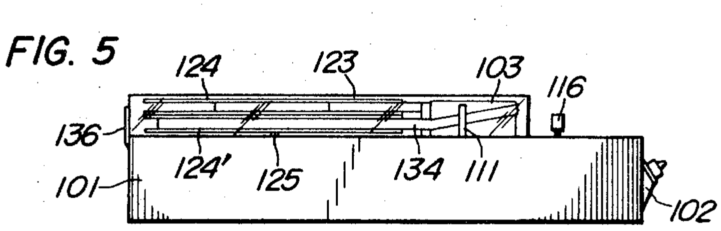
FIG. 5 is an elevational view of FIG. 4.

Another form of the tape drive system according to the present invention shown in FIGS. 3, 4 and 5 is intended to provide a less curved path for the magnetic tape although the tape cassette therein has a size slightly larger than that shown in FIG. 1. The tape drive system shown in FIGS. 3 to 5 is entirely similar in principle to that shown in FIG. 1 except that the cassette is larger than the cassette in FIG. 1 because the cassette in the present embodiment is designed to accommodate therein the cylindrical drum portion surrounding a rotary video head. The tape in the present embodiment can substantially unobstructedly travel as it is arranged to run along a path curved to an obtuse angle. Further, since the cassette substantially covers the entire apparatus, there is utterly no need of specifically providing a cover and protection against the intrusion of dust into the apparatus can thereby easily be attained. However, for the reasons as described above, the present embodiment may have a large size and a rather complex structure. It is recommended therefore to employ the system shown in FIG. 1 for an apparatus having a rotary head drum of a relatively large size and to employ the system shown in FIG. 3 for an apparatus having a rotary head drum of a relatively small size.

Referring now to FIGS. 3, 4 and 5, the magnetic recording and reproducing apparatus of the cassette type includes a body 101 containing therein a mechanism necessary for the video signal recording and reproduction. A control panel 102 is provided on the front wall of the body 101 in order to actuate the internal mechanism. On the upper wall of the body 101, there are a plurality of perforations 107, 108, 109 and 110 in which a rotary video head 103, an erase head 104, an audio and control head 105, and a capstan 106, respectively, can move vertically. Movable tape guide means 111 and 112, a pinch roller 113, a shield member 140 for forcing a magnetic tape onto the audio and control head 105, and driving members 114 and 115, all of which are operatively connected to a single actuating lever 116, protrude above the upper wall of the body 101 and are slidable back and forth in respective slots 117, 118, 119, 141, 120 and 121 formed in the upper wall of the body 101 in response to the actuation of the actuating lever 116 which is also slidable in a slot 122.

A tape cassette 123 adapted to be securely set on the body 101 of the apparatus is preferably made from a transparent resin or like material. Tape reels 124 and 124' accommodated in the cassette 123 in a coaxially stacked relation are mounted on a rotary shaft 125 which is drivingly connected to a drive source in the body 101 and extends upwardly through the upper wall of the body 101 to drive the tape reels 124 and 124' in a predetermined direction. Slots 126 and 127 are bored through the bottom wall adjacent to the respective opposite side ends of the tape cassette 123. In the slots 126 and 127, slides 130 and 131 normally urged in one direction by springs 128 and 129 are slidably disposed and have tape rejectors 132 and 133 rotatably mounted on the front ends thereof, respectively. The respective slides 130 and 131 are adapted to be abutted by the driving members 114 and 115 and are thus moved back and forth by following the movement of the driving members 114 and 115.

A magnetic tape 134 wound around the tape reels 124 and 124' is passed around the tape rejectors 132 and 133 and thus takes a position adjacent to the front end edge of the tape cassette 123 before the cassette 123 is mounted on the body 101 of the apparatus. The bottom wall of the tape cassette 123 is provided with a plurality of perforations for receiving therein the rotary video head 103, the erase head 104, the audio and control head 105, the capstan 106, and the rotary shaft 125, all of which are adapted to make their upward movement when the tape cassette 123 is set on the body 101 of the apparatus. A cut-out 135 is provided at the front portion of the bottom wall of the tape cassette 123 to permit the free sliding movement of the movable tape guide means 111 and 112, and of the pinch roller 113 and the shield member 140 into and out of the cassette 123. Further, in order to securely lock the tape cassette 123 in place when the cassette 123 is set on the body 101 of the apparatus, a plurality of engaging holes 138 and 139 are bored through the rear wall of the tape cassette 123 to receive therein respective L-shaped engaging lugs 136 and 137 extending from the rear wall of the body 101 of the apparatus.

The magnetic recording and reproducing apparatus of the cassette type having the tape drive system according to the invention operates in the manner described hereunder. Before the tape cassette 123 is set on the body 101, the rotary video head 103, the erase head 104, the audio and control head 105 and the capstan 106 are in their lower positions retracted into the body 101 of the apparatus. The slidable members actuated by the actuating lever 116 are also situated at their forward position on the body 101 to prepare for the mounting of the tape cassette 123 on the body 101 of the apparatus.

The situation in the tape cassette 123 before being mounted on the body 101 of the apparatus is such that the magnetic tape 134 is trained around the tape rejectors 132 and 133 which are urged to the forward extremities of the slots 126 and 127 by the springs 128 and 129 so that the magnetic tape 134 takes a position adjacent to the front end edge of the tape cassette 123.

In setting the tape cassette 123 on the body 101 of the apparatus under the above situation, the engaging lugs 136 and 137 on the rear wall of the body 101 are first fitted in the respective engaging holes 138 and 139 of the tape cassette 123, and then the tape reels 124 and 124' are fitted on the rotary shaft 125. When the tape cassette 123 is so set on the body 101 of the apparatus, the driving members 114 and 115 engage the respective slides 130 and 131.

In starting the desired recording or reproduction with the tape cassette 123 properly placed on the apparatus body 101, the actuating lever 116 is first urged in the direction as shown by the arrow in FIG. 3. The above movement of the actuating lever 116 causes the movement of the movable tape guide means 111 and 112, the pinch roller 113, the shield member 140, and the driving members 114 and 115 in the same direction as that of the actuating lever 116. More precisely, these members advance from their positions situated in the cut-out 135 provided at the front portion of the bottom of the tape cassette 123 toward the interior of the tape cassette 123. Further, in response to the above movement of the actuating lever 116, the rotary video head 103, the erase head 104, the audio and control head 105 and the capstan 106 protrude upwardly through the respective perforations to prepare for the recording or reproduction.

The movable tape guide means 111 and 112 and the pinch roller 113 moving in a unitary relation with the actuating lever 116 are brought into engagement with the magnetic tape 134 passing around the tape rejectors 132 and 133, which are also engaged by the driving members 114 and 115, so that the magnetic tape 134 takes a flexuous form by being urged by these advancing members. When finally the actuating lever 116 is locked at the position shown in FIG. 4, the magnetic tape 134 is engaged by the erase head 104, the shield member 140 and the audio and control head 105 as well as by the capstan 106 and the pinch roller 113, and is brought into engagement with the substantial portion of the rotary video head 103 by means of the movable tape guide means 111 and 112. The magnetic tape 134 is now ready to receive recordings thereon or to reproduce recordings therefrom. Under the above state, the control panel 102 may be suitably manipulated to drive the tape reels 124 and 124', the rotary video head 103 and the capstan 106 to effect the desired recording or reproduction.

Upon completion of the recording or reproduction, the actuating lever 116 may be unlocked to return to its original position. By the above return of the actuating lever 116 to its normal non-operative position, the rotary video head 103, the erase head 104, the audio and control head 105 and the capstan 106 are retracted to their non-operative positions in the body 101 of the apparatus, while the movable tape guide means 111 and 112, the pinch roller 113, the shield member 140, the driving members 114 and 115, and the tape rejectors 132 and 133 are also retracted to their non-operative positions as shown in FIG. 3. Under the state of the apparatus as shown in FIG. 3, the tape cassette 123 may be unloaded from the body 101 of the apparatus, or the quick feed or quick rewinding of the magnetic tape 134 may be made at high speed without being interfered by the rotary video head 103 and other members.

Figure 6:
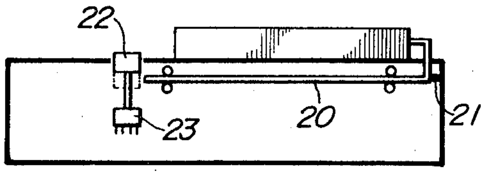
FIG. 6 is a schematic view of a rerecording preventing device employed in the apparatus shown in FIG. 1, the device being shown in an inoperative state in which it permits free recording on a magnetic tape.
Figure 7:
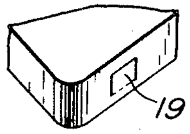
FIG. 7 is a perspective view of a part of the tape cassette shown in FIG. 1 having a means which cooperates with the rerecording preventing device.
Figure 8:
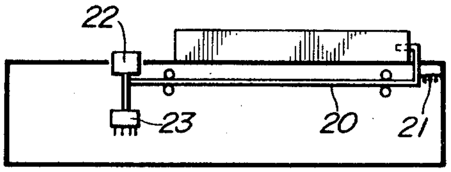
FIG. 8 is a view similar to FIG. 6, but showing the rerecording preventing device in an operative state in which it prevents a rerecording on the magnetic tape.
Figure 9:
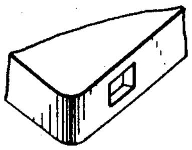
FIG. 9 is a view similar to FIG. 7, but showing the means removed to urge the rerecording preventing device to its operative position.

One of the important features of the tape drive system in magnetic recording and reproducing apparatus of the cassette type is the provision of a rerecording preventing device, as shown by the reference numeral 18 in FIG. 1, which is operative to prevent an unintentional erasing of a recorded tape by a user when such recorded tape is mounted in the tape cassette 3 for the playback thereof. One form of the rerecording preventing device 18 is schematically shown in FIGS. 6 and 7, and comprises a removable member 19 provided on a portion of the tape cassette, and a rerecording preventing lever 20 normally urged in one direction by a spring 21. It will be seen in FIG. 6 that, when the removable member 19 is left in place on the tape cassette, the rerecording preventing lever 20 is held in its non-operative position in which it does not obstruct the depression of a record button 22 so that the rerecording can be freely effected by depressing the record button 22 to actuate an associated switch 23. The removable member 19 on the tape cassette may be removed as shown in FIG. 9 when the erasing of the recordings on a magnetic tape is not desired. The withdrawal of the removable member 19 permits the rerecording preventing lever 20 to be urged to a position beneath the record button 22 as shown in FIG. 8, and the rerecording can not take place even if the record button 22 is depressed because the record button 22 can not move downwardly since it is restricted by the lever 20. As such a rerecording preventing device, an electronically operative device (not shown) may be employed.

The tape reels may be coaxially overlapped with each other as shown in FIG. 3, or the reels may be disposed in a juxtaposed relation in the same plane as shown in FIG. 1. In case the tape reels are coaxially overlapped with each other as shown in FIG. 3, or in case the reels are separately disposed with a certain vertical spacing therebetween, the rotary axis of the rotary video head may be substantially parallel with the rotary axis of the tape reels. In case, however, the tape reels are juxtaposed in the same plane as shown in FIG. 1, the rotary axis of the rotary video head must be inclined with respect to the rotary axes of the tape reels.

Figure 10:
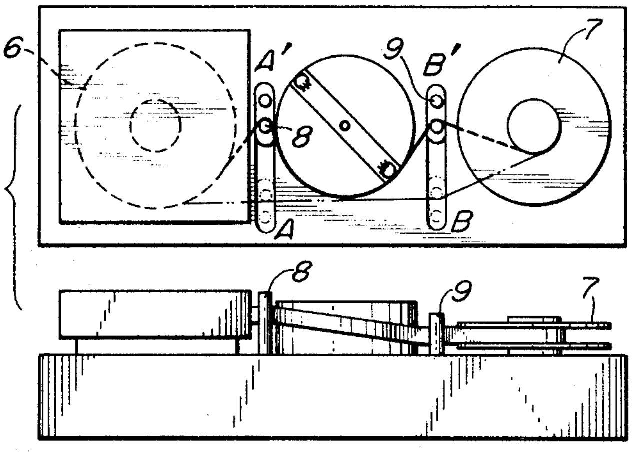
FIGS. 10A and 10B are a plan view and a side view, respectively, of a tape cassette structure consisting of two tape cassette sections each containing a reel therein, one of which is detachably mounted on the other.

In lieu of the tape cassette structure as shown in FIG. 1 or FIG. 3, the tape cassette structure may be as shown in FIG. 10 in which it will be seen that the cassette consists of two tape cassette sections each containing a tape reel therein, and one of the tape cassette sections is detachably mounted on the other. In such an arrangement, movable tape guide rollers similar to those shown in FIG. 1 may be employed to force a magnetic tape onto a rotary video head in order to establish a recording or reproducing engagement therebetween in the manner as described previously.

What is claimed is:

1. A magnetic video recording and reproducing apparatus, comprising:
- a main body member;
- a tape cassette detachably mounted on said main body member and having
  - a cassette body,
  - at least one elongated cut-out portion formed on one side of said cassette body and extending inwardly of said side from one edge portion thereof, and
  - at least one face portion extending from said one edge portion substantially at right angles to the plane of said one side, said face portion having at least one opening therein;

a tape supply reel and take-up reel housed in said cassette body for carrying a magnetic tape;

a plurality of first tape guides mounted in said cassette body, said magnetic tape being trained at least partially around said first tape guides, wherein the portion of said magnetic tape which extends between first and second of said first tape guides is disposed adjacent to said at least one opening in said face portion;

means for engaging with and holding said cassette on said main body member;

tape driving means, including a pinch roller and a capstan for operatively engaging said magnetic tape;

a plurality of slidably movable second tape guides mounted on said main body member, slidably movable between first and second positions, wherein in said first position, said second tape guides extend into said cassette body through said at least one elongated cut-out portion such that said magnetic tape is disposed between said second guides and said at least one opening in said face portion;

first and second stationary magnetic head means mounted on said main body member;

a cylindrical tape guide disposed on said main body member externally of said cassette body; and rotating magnetic head means disposed on said cylindrical tape guide;

wherein, in said second position, said second tape guides are disposed externally of said cassette body adjacent said cylindrical tape guide such that said magnetic tape portion extending between said first and second first tape guides extends out of said cassette body through said at least one opening, said magnetic tape portion being further trained at least partially around said slidably movable second tape guides and said cylindrical tape guide, said magnetic tape operatively engaging said first and second stationary magnetic head means and said rotating magnetic head means.

2. The apparatus according to claim 1, further comprising operating means operatively connected with said movable second tape guides and moving substantially parallel thereto.

3. The apparatus according to claim 1, further comprising:

a further opening defined in said one side of said cassette body;

and a still further opening in said one face portion;

wherein when said cassette is engaged with said main body member, said capstan extends into said cassette body through said further opening and said pinch roller extends into said cassette body through said still further opening, said magnetic tape being disposed between said capstan and said pinch roller and operatively engaged therewith inside said cassette body at least in said second position of said second tape guides.

4. A magnetic video recording and reproducing apparatus according to claim 1, in which the central axis of said cylindrical tape guide is inclined with respect to the central axes of said tape supply reel and take-up reel.

5. A magnetic video recording and reproducing apparatus, comprising:

a main body member;

a tape cassette detachably mounted on said main body member and having;

a cassette body, and at least one cut-out portion formed in the base portion of said cassette body and extending inwardly from one edge portion thereof;

a tape supply reel and take-up reel housed in said cassette body for carrying a magnetic tape;

a plurality of first slidably movable tape guides mounted in said cassette body and slidably movable between first and second positions, said magnetic tape being trained at least partially around said first tape guides;

tape driving means, including a pinch roller, slidably movable between first and second positions, and a capstan operatively engageable with said magnetic tape;

a plurality of second slidably movable tape guides mounted on said main body member and slidably movable between first and second positions, wherein, in said first position, said second tape guides are held out of engagement with said magnetic tape;

at least one stationary magnetic head means disposed on said main body member;

a cylindrical tape guide disposed on said main body member;

rotating magnetic head means disposed on said cylindrical guide; and means slidably moving said first and second tape guides and said pinch roller from said first positions into said second positions wherein said second tape guides and said pinch roller are disposed in operative engagement with said magnetic tape internally of said cassette body, said second tape guides being disposed adjacent said cylindrical guide such that a portion of said magnetic tape extending between first and second of said first tape guides is further trained at least partially around said second tape guides and said cylindrical guide, said magnetic tape operatively engaging said stationary magnetic head means and said rotating head means.

6. The apparatus according to claim 5, wherein said second movable tape guides are movable between said first and second positions in parallel relationship to each other and on opposite sides of said cylindrical tape guide and wherein said second position of said second tape guides is disposed nearer said cylindrical tape guide than said first position of said second tape guide.

7. The apparatus according to claim 5, further comprising means normally biasing said first movable tape guides in the direction of said first position of said first movable tape guides.

8. The apparatus according to claim 5, wherein said cylindrical tape guide is vertically movable between a first position internally of said cassette body and a second position externally of said cassette body and internally of said main body member.

* * * * *